3,563,677
COMPRESSOR
Fred S. Retan, Manlius, N.Y., assignor to Carrier Corporation, Syracuse, N.Y., a corporation of Delaware
Filed Apr. 1, 1969, Ser. No. 812,242
Int. Cl. F04b 35/04
U.S. Cl. 417—415                                       1 Claim

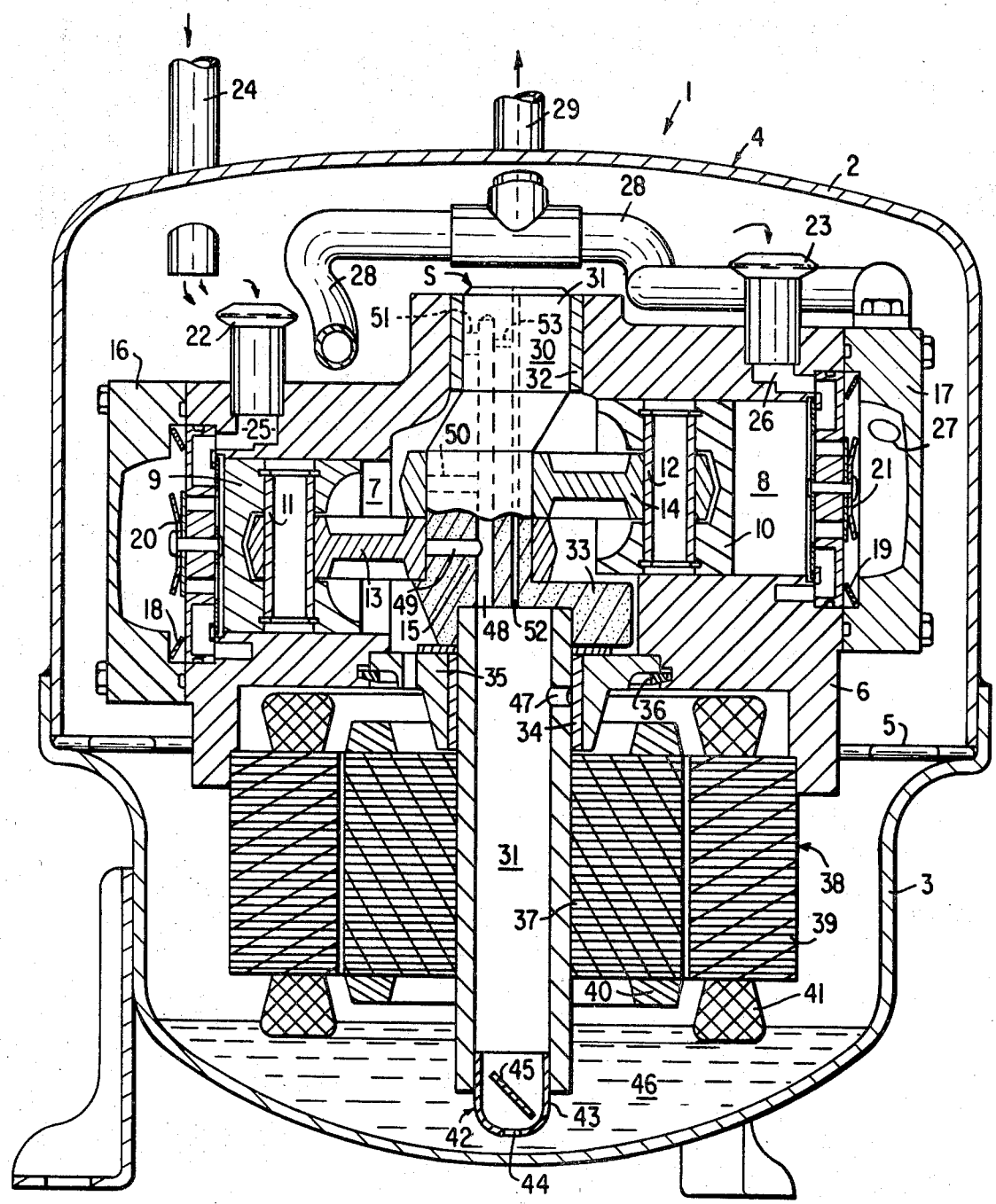

ABSTRACT OF THE DISCLOSURE

The present invention is directed to reciprocating compressors for use in refrigeration systems comprising a housing mounting therewithin a compressor block having a vertically extending crankshaft journaled therein which is operatively connected to one or more pistons reciprocatingly mounted in one or more cylinders defined by the compressor block. The crankshaft comprises an integral upper crank member formed with bearing, eccentric and counterweight portions, and a lower tubular member which interfits at its upper end with the eccentric and counterweight portions of the crank member and supports generally intermediate the upper and lower ends the rotor of the motor mechanism. A crankshaft of this character has significant manufacturing and operational advantages since the tubular member utilizes a lesser amount of material without sacrifice in strength and achieves improved oil pumping action, and the crank member, if produced by powder metallurgy, requires less machining and the balance properties are improved.

BACKGROUND OF THE INVENTION

Conventionally, crankshafts employed in compressors used in refrigeration machines are produced as a unitary body by forging or casting techniques, that is to say, the crank detail made up of the end bearing, eccentric and counterweight is formed as a unitary part and in the same process with the motor end journal and rotor shaft. Prior to assembly of the crankshaft with the other parts of the compressor, additional processing steps are naturally required. First, substantial machining is necessary in order to meet the precise tolerances specified, and second, passages for the flow of oil from the sump to the moving parts of the compressor must be drilled. Since on many crankshafts the rotor shaft is of substantial length, it can readily be appreciated that the drilling operation is quite time consuming. Then, too, since even after drilling the rotor shaft is essentially a solid body, weight is added to the compressor which is really not necessary in order to produce the performance required.

SUMMARY OF THE INVENTION

The present invention is particularly directed to a hermetic reciprocating compressor for a refrigeration machine wherein there is journaled in the compressor block a vertically extending crankshaft formed initially of two separate parts, namely an upper crank member provided with bearing, eccentric and counterweight portions produced as a unit by forging, casting or powder metallurgy techniques, and a lower tubular member subsequently joined to the crank member to provide a unitary body. The tubular member may be of any desired length and wall thickness and may be brazed or otherwise secured to the eccentric and counterweight portions of the crank member after location in a suitable cavity formed in said portions, or the tube can be inserted upon a stub extending from the eccentric and counterweight portions and be then secured thereto in any desired manner. Alternatively, if powder metallurgy is used to form the upper crank member, the tube may be attached thereto during the sintering process, thereby eliminating the necessity for brazing.

In any event, by the present invention there is provided a crankshaft capable of production at reduced costs and possessed of the requisite strength and reliability of operation, while also producing an improvement in the oil pumping action and balance characteristics.

BRIEF DESCRIPTION OF THE DRAWING

The single figure is a sectional view of a compressor embodying the novel concepts of this invention.

DESCRIPTION OF THE PREFERRED EMBODIMENT

Referring now to the drawing, there is shown a compressor 1 of the kind used to compress refrigerant gas in a mechanical refrigeration machine comprising upper and lower shells 2 and 3 welded or otherwise secured one to the other to provide a hermetic housing 4. Located within the housing and joined to shells 2 and 3 is a support member 5 upon which is resiliently mounted compressor block 6 having cylinder bores 7 and 8 formed therein. The bores are shown as offset with respect to one another, although they may be located in opposed relation. Also, the compressor may be of the single cylinder type, or may utilize four cylinders within the scope of this invention. Suitable pistons 9 and 10 are reciprocatingly mounted within the cylinders 7 and 8 and by means of wrist pins 11 and 12 are connected to connecting rods 13 and 14 which are journaled on eccentric portion 15 of crankshaft S, the structural details of which will be later described.

The compressor block 6 has secured thereto cylinder heads 16 and 17 contacting on their inner surfaces resilient means 18 and 19 which press against suction and discharge valve assemblies 20 and 21, respectively, located at the extremities of the cylinders 7 and 8. Suction gas stacks 22 and 23 communicate at one end with passage 24 in shell 2 and at the other end with suction ports 25 and 26 in compressor block 6 and the cylinder head valve assemblies 20 and 21, respectively. Discharge gas from the cylinders flows through discharge valves of valve assemblies 20 and 21 through passage 27 to compressor discharge line 28 and out passage 29 in shell 2.

The crankshaft S to which the present invention is particularly directed is comprised of two drivably connected and separately formed parts, one of which is an essentially solid shaped mass and the other a substantially cylindrical tube of generally uniform wall thickness throughout its length. These two parts are referred to herein as an upper crank member and a lower tubular member and the numerals 30 and 31 designate these parts in the drawing. As is shown, the upper crank member 30 of the shaft S is formed to provide an essentially straight upper bearing portion 31 journaled in bearing 32 seated in the compressor block 6, an eccentric portion 15 on which the connecting rods 13 and 14 are journaled, and a counterweight member 33. As is known, the counterweight is an irregular portion designed to aid in counteracting the unbalance of the eccentric portion of the crank member. Commonly the crank member is cast or forged, however, by this invention additional advantageous results are obtained when this member is made by powder metallurgy, as will shortly be explained.

Drivably connected to the eccentric portion 15 and counterweight member 33 is lower tubular member 31 of the crankshaft S, the tube 31 downwardly of its point of connection to the eccentric and counterweight being journaled in bearing 34 seated in lower bearing support member 35 held in position by a retaining ring or the like 36. The tube 31 generally intermediate its upper and lower ends supports by a force fit rotor 37 of motor 38, the rotor being inductively associated with stator 39 mounted by compressor block 6. As is conventional, rotor 37 has a conductor 40 and coil 41 forms a part of the stator 39.

In the embodiment of the invention shown, the tube 31 at its lower end supports an oil impeller assembly 42 which may take the form of an inverted dome-shaped member 43 having a passage 44 therein, the member 43 having fixedly positioned interiorly thereof a disc 45 to aid in the centrifugal impelling of oil from sump 46 in the bottom of shell 3. Means for impelling the oil upwardly in the tube 31 for lubricating the compressor moving parts may of course take other forms, as for example, it may be adequate for certain applications to merely roll the extreme lower end of tube radially inwardly.

In order to effect adequate lubrication of the compressor moving parts, a plurality of oil discharge openings or passages are provided which communicate with oil sump 46. Tube 31 has a hole 47 in the wall thereof to lubricate lower bearing 34, the upper crank member 30 is drilled to provide a vertically extending passage 48 therein which communicates with radial passages 49, 50 and 51 leading to connecting rod 13, connecting rod 14 and upper bearing 32. The upper crank member 30 also has a vent passage 52 therein, and since when the oil pumping action takes place some gas may be entrained with the oil moving through passage 48, a radial passage 53 connects passages 48 and 52 for venting purposes.

While the operation of the compressor 1 of this invention is believed apparent from the foregoing disclosure, a brief description thereof will be given. Electric current from a suitable source is passed through the coil or conductor 41 into the stator 39 of motor 38. This causes the rotor 37 to rotate, thereby imparting rotation to crankshaft S. Since the connecting rods 13 and 14 are connected to eccentric portion 15 of upper crank member 30, which is a part of the crankshaft, and since the opposite ends of these connecting rods are connected to wrist pins 11 and 12 which are attached to pistons 9 and 10, reciprocation of these pistons within the cylinders 7 and 8 occurs, causing compression of the gas therein.

Gas is introduced through passage 24 in the housing shell 2 and passes into the suction gas stacks 22 and 23 which communicate with suction ports 25 and 26 in the compressor block 6. Depending upon which piston is on the suction or compression stroke, the valve assemblies 20 and 21 are selectively actuated in the manner known to the art, and the discharge gas flows through passage 27 to compressor discharge line 28 and out passage 29 in the housing shell 2.

Lubrication of the compressor is carried out by circulating the lubricant in the lower section of the shell 3, which constitutes the oil sump 46. As the crankshaft S rotates, the oil passes through opening 44 in the oil impeller assembly 42 and is forced upwardly in the tube 31 by the impelling action of the disc 45. The oil is centrifuged within the tube, and with a small amount of gas entrained therein, flows into the vertical passage 48 in the upper crank member 30 and radially outwardly into passages 49, 50 and 51 to lubricate the connecting rods 13 and 14 and upper bearing 32. Lower bearing 34 in which the tube 31 is journaled is of course lubricated through the opening 47. Any gas entrained in the upwardly moving oil passes through radial passage 53 which communicates with passage 48 and passage 52 and is vented out the upper end of the latter passage.

As noted earlier, a crankshaft S when constructed as shown and described has a number of important manufacturing and operational advantages. First, in comparison to a crankshaft which is cast or forged in a single piece, the provision of a tube which performs the dual functions of supporting the motor mechanism and delivering oil from the sump to the moving parts of the compressor results in significant weight reductions in the rotor shaft without strength sacrifices and eliminates the necessity of drilling oil passages in the rotor shaft which in many applications is of substantial length. A high degree of accuracy is required in the drilling operation to assure that the rotor shaft passages align with the oil passages in the upper crank, and this quite naturally is a time consuming task. Further, since a tube as provided by this invention presents an increased cross-sectional area for lubricant flow, the centrifuging action is improved and there is less entrainment of air in the oil which is delivered to the compressor moving parts.

The tube 31 is preferably formed from commercial grade cold rolled steel, and the wall thickness of course depends on the strength desired. The upper crank member 30 is forged or cast in the conventional manner from known steels possessed of the desired strength properties. If the crank member 30 is a casting or forging, a suitable manner of effecting securement of the tube thereto is to machine a cavity in the eccentric and counterweight portions 15 and 33 of the upper crank, locate one end of the tube 31 therein and effect a brazed joint. Alternatively, the portions 15 and 33 may have an outwardly extending stub formed thereon, one end of the tube slipped onto the stub, and the two parts brazed to provide a composition structure wherein these two parts are drivably connected to one another.

A forged or cast upper crank member, in order to achieve the desired degree of precision with its mating compressor components requires substantial machining, that is, a number of cuts must be made to meet tolerance requirements. The machining time can be substantially reduced in accordance with this invention by forming the upper crank member by powder metallurgy techniques. An essentially carbon-free steel is employed, and alloy steels suitable in the sintering process have a general composition in which the combined carbon is about 0.30% to 0.80%, iron 90.0% to 98.0%, nickel 1.65% to 7.50%, and if added, molybdenum 0.20% to 0.30%, all percentages being by weight. The tensile strength range is generally between 54,000 p.s.i. to 120,000 p.s.i., the higher values being after heat treating.

When utilizing powder metallurgy to produce the upper crank member 30, during the sintering operation the tube 31 may readily be joined thereto, forming a secure metal-to-metal bond which resists fracture during normal compressor life. The powder metallurgy process also has the important advantage of reducing to a minimum the finishing operation, and since the sintered body is a dense and compact mass, the upper crank member has improved balance.

Various modifications may of course be effected without departing from the spirit of the invention or the scope of the subjoined claim.

I claim:

1. In a reciprocating compressor, the combination of a housing, a compressor, including a block member, supported by said housing and defining at least one radially disposed cylinder, a piston reciprocatingly mounted in said cylinder, a crankshaft having a crank member journaled in said block and being operatively connected to said piston and a separate tubular member drivingly connected to said crank member and also being journaled in said block, and motor means supported by said tubular member for imparting rotative movement thereto and to said crank member for causing reciprocation of said piston in said cylinder, said crank member being of sintered construction and comprising a bearing portion, an eccentric portion and a counterweight member, in which one end of said tubular member is integrally joined to said crank member during the sintering thereof, and in which said tubular member has a relatively wide inner diameter for directing lubricant from the lower portion of said housing to lubricate said piston and operatively associated parts.

References Cited
UNITED STATES PATENTS

| | | | |
|---|---|---|---|
| 2,696,434 | 12/1954 | Bartlett | 29—156.4X |
| 2,125,645 | 8/1938 | Money | 230—206X |

ROBERT M. WALKER, Primary Examiner